United States Patent Office 3,444,241
Patented May 13, 1969

3,444,241
PROCESS FOR THE PREPARATION OF
DIALKYL POLYSULFIDES
Wolfgang T. Eisfeld, Troisdorf, Germany, and Edward D.
Weil, Yonkers, N.Y., assignors to Stauffer Chemical
Company, New York, N.Y., a corporation of Delaware
No Drawing. Filed Nov. 14, 1966, Ser. No. 593,742
Int. Cl. C07c 149/12
U.S. Cl. 260—608                                    8 Claims

ABSTRACT OF THE DISCLOSURE

Process for the preparation of dialkyl polysulfides through the reaction of a vinyl halide compound with a hydrosulfide salt in the presence of hydrogen sulfide. The process is preferably conducted at autogenous pressures in the presence of a suitable solvent for the reactants.

---

The present invention relates to a method of preparing dialkyl polysulfides from vinyl halide type compounds. More particularly this invention relates to a method of preparing dialkyl polysulfides from inexpensive starting materials, such as vinyl chloride, an alkali metal hydrosulfide, hydrogen sulfide, and the like.

Previous methods of synthesis of dialkyl polysulfides have required the use of the relatively expensive alkyl mercaptans and/or alkyl halides. The present invention as indicated above dispenses with the use of such starting materials. The prior art methods have included the preparation of dialkyl polysulfides through the reaction of alkyl halides with alkali metal polysulfides, by reacting thiols with sulfur chlorides or by heating disulfides with sulfur. In addition to the low cost of the materials used in the present process, the simplified procedure and the absence of need to have purified starting materials provides the present process with distinct advantages.

The dialkyl polysulfides produced by the method of this invention have known utility in a wide variety of applications, included among these utilities are lubricating oil additives, insect repellents, and pesticides, and plasticizers for sulfur.

In accordance with the present invention, dialkyl polysulfides are prepared through the reaction of a vinyl halide with a hydrosulfide compound in the presence of hydrogen sulfide in a solvent.

The vinyl halide compounds which are useful in the present process are those having the formula:

Formula I

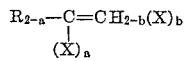

wherein R is a hydrogen or a hydrocarbyl group containing from 1 to 12 carbon atoms inclusive, $a$ and $b$ are integers having a value of from 0 to 1 inclusive such that the sum of $a$ and $b$ is one. Included within the term hydrocarbyl group are the alkyl groups such as methyl, ethyl, propyl, isopropyl, butyl, isobutyl, tert-butyl, pentyl, hexyl, heptyl, octyl, nonyl, decyl, undecyl, dodecyl, and the like; the cycloaliphatic groups such as cyclopropyl, cyclobutyl, cyclopentyl, cyclohexyl and the like; and the aromatic groups such as phenyl, benzyl, phenyl ethyl, naphthyl, biphenyl and the like and X is a halogen atom such as fluorine, chlorine, bromine and iodine and preferably is a halogen atom having a molecular weight greater than 30 and most preferably is chlorine.

The hydrosulfides which are useful in the conduct of the present process include those having the formula:

Formula II

wherein Z is a group I–A or II–A metal ion such as the alkali metals as for example, sodium, potassium, lithium and the like; the alkaline earth metals such as for example calcium, magnesium, barium and the like; the nitrogen containing salt-forming groups such as ammonia, the lower alkyl amines such as the primary amines, for example methylamine, ethylamine, propylamine, butylamine, hexylamine, octylamine, the aromatic primary amines such as aniline, the cycloaliphatic amine such as cyclohexyl amine, the secondary lower alkyl amines such as dimethylamine, diethylamine, dipropylamine, dibutylamine, dihexylamine and the like. The salt-forming aromatic amines such as mixed alkyl aromatic amines such as N-methyl aniline, the tertiary amines such as the trialkyl amines as for example trimethylamine, triethylamine, tripropylamine, tributylamine, trihexylamine and the like, the aromatic containing tertiary amines such as N,N-dialkylamines as for example N,N-dimethylaniline and the heterocyclic tertiary amines such as pyridine, morpholine and the like can also be used. The $x$ in Formula II above represents an integer having a value of from 1 to 2 inclusive and is equal to the valence of the ion or salt forming group Z such that, for example, in the case wherein Z represents calcium, $x=2$, wherein Z is ammonium, $x=1$, and wherein Z is sodium, $x=1$.

The chemical reaction of the present process can be typified by the reaction diagram set forth below.

Reaction diagram I:

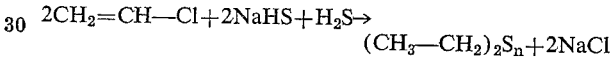

wherein $n$ is greater than one and in diagram above averages 3.

In the conduct of the present process, the reactants can be used in stoichiometric amounts; however, the hydrogen sulfide, the hydrosulfide or both can be used in excess if desired. Additionally it should be noted that the presence of air or free sulfur during the reaction increases the sulfur rank of the product and this can be utilized to prepare compounds having a greater sulfur rank where this is desired.

The reaction of this process is conveniently conducted at temperatures of from about 50° C. to about 200° C. when vinyl chloride is utilized as the starting material. Although higher and lower temperatures can be used for different vinyl halides if desired, it is most preferred to use temperatures in the range of from about 70° C. to about 170° C. when the starting vinyl halide is vinyl chloride. This preference is dictated by the fact that the reaction is a liquid phase reaction and the critical temperature of vinyl chloride is about 150° C. and the critical temperature of hydrogen sulfide is about 100° C. The process of this invention is most conveniently run at autogenous pressure as for example in an autoclave. It is possible, however, to use pressures in excess of atmospheric both below the autogenous pressure and above the autogenous pressure. The subject reaction is most desirably conducted in the presence of a nonreactive solvent or diluent. Suitable solvents include those solvents which exhibit solvating properties for the reactants, i.e., the hydrosulfide, the vinyl halide, and the hydrogen sulfide being used. In the case of vinyl chloride, water is the preferred solvent both because of its availability and lack of expense and its solvent properties. In the case of the hydrophobic vinyl halides, such as 2-chloropropene, which exhibits relatively low solubility in water, the addition of diethyl ether or similar oleophilic type solvent can be desirable in order to obtain a product in high yield. This other solvent can be simply admixed with water or other solvent. Other solvents which are suitable include the alkanols such as methanol, ethanol, propanol and the like, amides such as dimethyl formamide, sulfones such as tetramethylene sulfone and similar polar solvents.

In the process of the invention, the isolation of product is extremely simple, especially when water has been used as solvent. After venting the reactor of excess hydrogen sulfide, the reaction mixture is found to consist of two liquid phases; the aqueous phase containing excess hydrosulfide and chloride compounds such as metallic chlorides, the organic phase comprising of course the polysulfide product. The organic polysulfide product can be obtained in a variety of ways such as by decanting or directly distilling and can be further purified by distillation and/or washing.

The examples which follow serve to illustrate this invention and these examples and throughout the specification all parts and percentages are by weight.

Example 1

A stainless steel autoclave was evacuated to remove air, then charged with 25 g. vinyl chloride, 29 g. hydrogen sulfide, 60 g. sodium sulfide nonahydrate, and 100 g. water, and then heated and stirred at 152–165° C. for 12 hours at autogenous pressure. The reactor was then cooled, the pressure released to atmospheric, and the liquid contents placed in a separatory funnel. The organic layer was separated and found to consist of 30 grams of clear yellowish liquid, $N_D^{21}$ 1.583. The nuclear magnetic resonance spectrum showed the presence of ethyl groups and the infrared spectrum was very similar to that of diethyl sulfide. Analysis for total sulfur showed the product to have the average composition $(C_2H_5)_2S_3$. Fractional distillation under vacuum was employed to separate this product into a series of fractions of increasing sulfur rank, from $(C_2H_5)_2S_2$ to $(C_2H_5)_2S_5$.

Example 2

In a like manner to Example 1, 25 g. vinyl chloride, 17 g. hydrogen sulfide, 105 g. of sodium hydrosulfide (70% NaHS content), and 100 g. of water were heated and stirred at 88–92° for 16 hours. The liquid organic product amounted to 26 g. of diethyl polysulfide (average composition $C_2H_5S_3C_2H_5$). The yield (based on vinyl chloride) is 84%. Similar runs made as above but omitting either the sodium hydrosulfide or the hydrogen sulfide yielded no detectable product.

Example 3

In the same manner as in Example 1, 25 g. of vinyl chloride, 17 g. hydrogen sulfide, 100 g. of sodium hydrosulfide (70% active ingredient), and 100 g. of water were heated at 122–128° for 15 hours, to obtain a product identical with that of Example 1.

Example 4

In the same manner as in Example 1, 25 g. vinyl chloride, 34 g. hydrogen sulfide, 30 ml. concentrated aqueous ammonia (immediately converted to $NH_4HS$) and 70 ml. water were heated at 145–8° for 3 hours, then cooled and the organic product separated to obtain 25 g. of $(C_2H_5)_2S_3$ (average composition).

Example 5

In a stirred autoclave, a mixture of 35 g. 2-chloropropene, 20 g. hydrogen sulfide, 40 g. sodium hydrosulfide (70%), 50 g. water, and 35 ml. diethyl ether was heated at 140–165° for 13 hours. The mixture was cooled, the pressure released, and the organic layer separated off. After evaporation of the ether, the organic product was identified by n.m.r. analysis as a diisopropyl polysulfide. Total sulfur analysis showed the average composition to be $(CH_3)_2CHS_3CH(CH_3)_2$ and fractional distillation showed the product to consist of diisopropyl polysulfide ranging in sulfur content from the disulfide to the pentasulfide.

Example 6

A mixture of 45 g. vinyl chloride, 40 g. hydrogen sulfide, 8 g. of sodium sulfide nonahydrate, and 50 g. water was stirred and heated at 65° for 12 hours. Only a negligible amount of product was obtained.

Example 7

A mixture of 29 g. vinyl chloride, 31 g. hydrogen sulfide, 11 g. sodium sulfide nonahydrate, and 40 ml. water was heated and stirred in an autoclave at 185° for 12 hours. A poor yield (2.5 g.) of crude organic product was obtained which by n.m.r. and gas chromatography was found to contain, inter alia, ethyl mercaptan, thioacetaldehyde trimer and ethanedithiol.

The products obtained through the process of this invention are invariably mixtures of polysulfides. Utilizing pure starting materials, the average sulfur rank was approximately 3. The actual sulfur rank varied from 2 to in excess of 4. Monosulfide was not present significantly. If the hydrosulfide used contained free sulfur or alkali metal polysulfide or if air was present during the reaction, the average sulfur rank was higher than with starting materials which were pure in the absence of air. Excess hydrogen sulfide or excess hydrosulfide did not in any way affect the rank of the sulfur in the product. Increasing the sulfur rank of the polysulfide mixture is possible by heating it with sulfur by techniques well known in the art. The polysulfide products of the invention are also useful as intermediates for synthesis of alkyl mercaptans, by treatment of the polysulfide with reducing agents (such as hydrogen in the presence of a metal sulfide hydrogenation catalyst).

What is claimed is:

1. A method of preparing dialkyl polysulfides which comprises reacting a vinyl halide having the formula:

Formula I

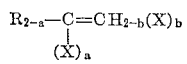

wherein R is selected from the group consisting of hydrocarbyl radicals containing from 1 to 12 carbon atoms inclusive and hydrogen, X is a halogen atom and $a$ and $b$ are integers having a value of from 0 to 1 inclusive such that the sum of $a$ and $b$ is 1 with a hydrosulfide reactant selected from the group consisting of alkali metal hydrosulfides, alkaline earth metal hydrosulfides, ammonium hydrosulfides and amine hydrosulfides in the presence of hydrogen sulfide at a temperature of from about 50° C. to about 200° C. in the liquid phase.

2. The method of claim 1 wherein the vinyl halide reactant is 2-chloropropene at a temperature of from about 50° C. to about 200° C. inclusive.

3. The method of claim 1 wherein the hydrosulfide is an alkali metal hydrosulfide.

4. The method of claim 1 wherein the hydrosulfide is sodium hydrosulfide.

5. The method of claim 1 wherein the hydrosulfide is ammonium hydrosulfide.

6. The method of claim 1 wherein the vinyl halide reactant is vinyl chloride and the reaction is conducted at a temperature of from about 50° to about 200° C. inclusive.

7. The method of claim 1 wherein the reaction is conducted at autogenous pressure.

8. The method of claim 1 wherein the solvent used is water.

References Cited

Reid: "Chemistry of Bivalent Sulfur," vol. II (1958), p. 35.

CHARLES B. PARKER, *Primary Examiner.*

D. R. PHILLIPS, *Assistant Examiner.*